Patented Jan. 9, 1934

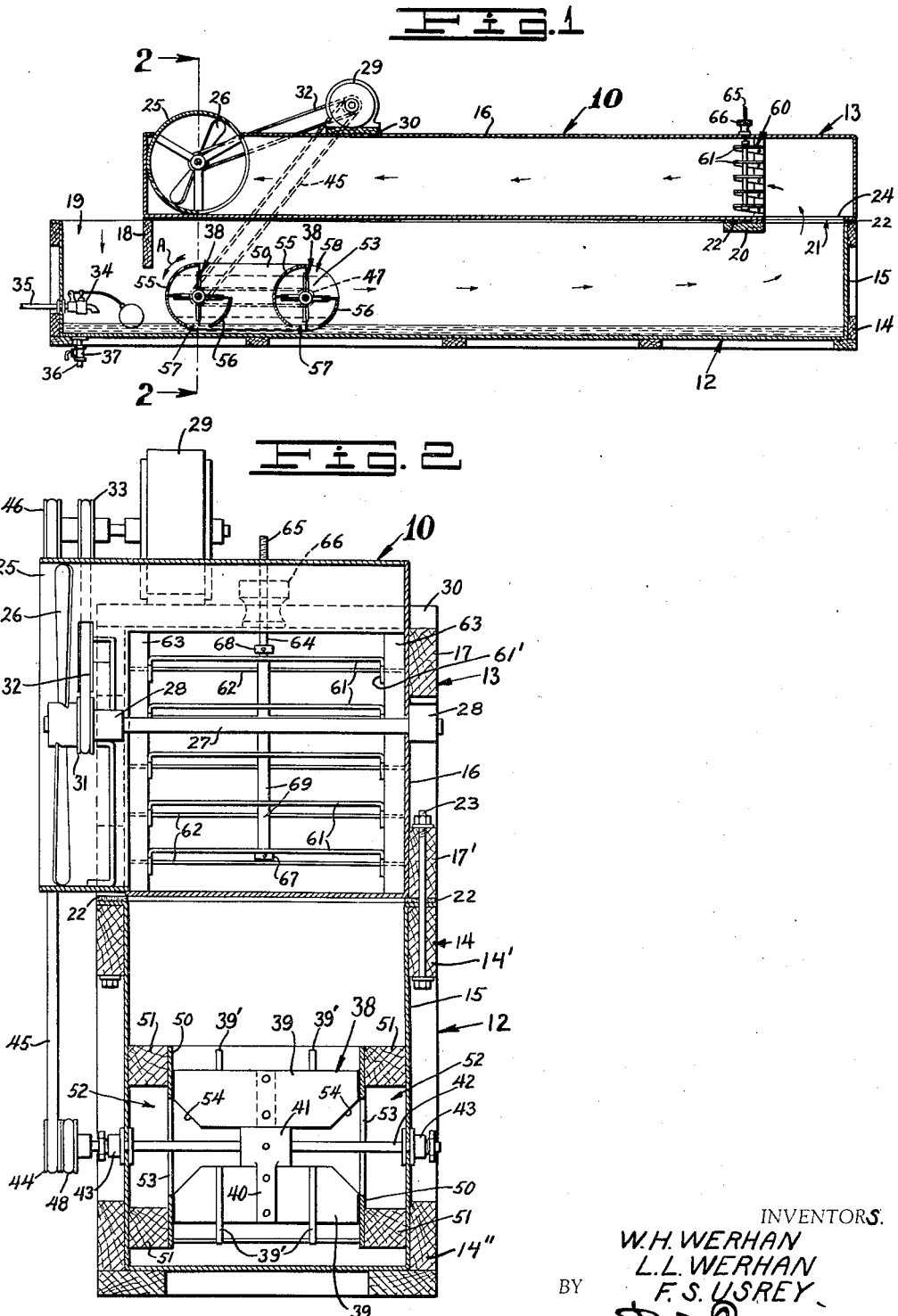

1,942,502

UNITED STATES PATENT OFFICE 1,942,502

HUMIDIFIER

William H. Werhan, Lawrence L. Werhan, and Frank S. Usrey, Pasadena, Calif.

Application June 11, 1932. Serial No. 616,676

4 Claims. (Cl. 261—92)

This invention relates to improvements in humidifiers.

The general object of this invention is to provide an improved mechanically operated humidifier.

Another object of the invention is to provide a humidifying device wherein water and air are centrifugally mixed by mechanical means.

A further object of the invention is to provide means for regulating the amount of moisture expelled from the device when the device is operating at its maximum capacity and without altering the amount of air expelled from the device.

Other objects and the advantages of this invention will be apparent from the following description taken in connection with the accompanying drawing wherein:

Fig. 1 is a central vertical section through our improved humidifying device.

Fig. 2 is a section taken on line 2—2 of Fig. 1.

Referring to the drawing by reference characters, we have indicated our improved humidifying device generally at 10. As shown the device 10 comprises a lower portion 12 and an upper portion 13.

The lower portion 12 includes a frame 14 comprising upper and lower members 14' and 14'' and having a tank 15 therein which is open at the top. The top portion 13 includes a hollow enclosed conduit portion 16 having upper and lower frame members 17 and 17' secured to the sides thereof.

Adjacent one end of the tank 15, we provide a transversely extending baffle member 18 which extends downward from the top of the tank a predetermined distance. The space between the baffle member 18 and the adjacent end of the tank 15 forms an entranceway 19. Adjacent the opposite end of the tank 15, we provide a transversely extending flat supporting member 20. The space between the member 20 and the adjacent end of the tank 15 forms an exit passageway 21.

The upper portion 13 of the device is positioned on top of the lower portion 12 and extends from the end of the lower portion adjacent the exit passageway 21 to the entranceway 19. At the points where the member 14' engages the member 17' we provide felt gasket members 22 and the upper and lower portions are adapted to be secured together by bolts and nuts 23 which pass through the members 14' and 17' (see Fig. 2).

In the under-face of the conduit 16 and in line with the exit passageway 21 of the lower portion, we provide an entrance aperture 24. Adjacent the opposite end of the conduit 13, we provide a cylindrical exit conduit 25 which communicates with the interior of the conduit 13 and opens outward therefrom at right angles to the conduit 13. Positioned in the conduit 25 we provide a propeller or fan 26 which is secured to a shaft 27 rotatably mounted in bearings 28.

For rotating the shaft 27, we provide an electric motor 29 which is shown as mounted on a supporting bar 30 secured to the frame members 17 of the upper portion 13. The hub of the fan 26 has a pulley portion 31 integral therewith which is adapted to be driven by a belt 32 from a pulley 33 secured to the armature shaft of the motor 29. The motor 29 is adapted to rotate the shaft 27 in a direction whereby the fan 26 will draw air through the entranceway 19 into the tank 15 thence out the tank exit passageway 21 and through the entrance aperture 24 of the conduit 16 into the conduit 16 and thence out through the conduit 25 as indicated by the arrows in Fig. 1.

The tank 15 is adapted to have a predetermined amount of water therein at all times and for this purpose, we provide a float actuated valve 34 which controls the flow of water from a pipe 35 into the tank 15. The pipe 35 is adapted to communicate with a source of fresh water supply. To empty the tank 15, we provide a drain pipe 36 having a control valve 37 interposed therein.

For agitating the water in the tank 15 and mixing a certain amount of the water with the air passing through the tank 15, we provide a plurality of paddle wheels 38. Each of the paddle wheels 38 include a plurality of vanes 39 which are secured to arms 40 of a hub or spider 41 (see Fig. 2). The hubs 41 are each secured to a shaft 42 which is rotatably mounted in bearings 43 mounted on the tank 15. One of the shafts 42 has a double pulley 44 secured thereto which is adapted to be driven by a belt 45 from a pulley 46 secured to the armature shaft of the motor 29 and the other shaft 42 has a pulley 47 secured thereto which is adapted to be driven by a belt 48 from the double pulley 44.

Each of the vanes 39 have a plurality of spaced pins 49 secured thereto which project radially outward a predetermined distance from the diametrical edges thereof. The vanes 39 are of less length than the width of the tank 15 and adjacent sides of the vanes we provide plates 50 which are mounted adjacent the top and bottom thereof on bars 51 secured to the side walls of the tank 15. Thus a passageway 52 is formed on each side of the paddle wheels 38.

In each of the plates 50 and coaxial with the shafts 42, we provide apertures 53 which form passageways through the plate 50 from the passageways 52. A portion of the ends of the vanes 39 are preferably tapered inwardly as at 54 from a point adjacent the periphery of the apertures 53. Adjacent the forward portion of each of the paddle wheels 38, we provide a guard member 55 which extends from a point approximately vertically above the axis of the shaft 42 to a point spaced forward of vertically below the axis of the shaft 42. Adjacent the rear portion of each of the paddle wheels 38, we provide a guard member 56 which extends from a point approximately horizontally in line with the axis of the shaft 42 to a point spaced to the rear of vertically below the axis of the shaft 42 thus leaving an opening 57 between the lower ends of the guard members 55 and 56 and a larger opening 58 between the upper ends of the guard members 55 and 56.

The water level in the tank 15 is adapted to be maintained at a level whereby the edges of the vanes 39 will not dip into the water as the paddle wheels rotate but a portion of each of the pins 39' will dip into the water. The paddle wheels 38 are adapted to be rotated in a direction towards the entranceway 19 as indicated by the arrow A in Fig. 1.

When the motor 29 is operating to rotate the fan 26 and the paddle wheels 38, air is drawn into the tank 15 and then into the conduit 16 and out the conduit 25 as previously described. As the paddle wheels 38 rotate the pins 39' thereof dip into the water in the tank and centrifugal force throws the water therefrom out through the openings 58 between the upper ends of the guard members 55 and 56. The water thus expelled from the pins 39' mixes with the air traveling through the tank and is carried into conduit 16 and out the conduit 25 with the air.

Furthermore as the paddle wheels 38 rotate the vanes 39 thereof draw air from the conduits 52 through the apertures 53 in the plates 50 and force this air out through the openings 58 with the water expelled from the pins 39' thus thoroughly mixing the expelled water with air.

To regulate the amount of moisture expelled from the device we provide a baffle member 60 which is preferably positioned in the conduit 16 adjacent the aperture 24 therein. As shown the baffle member 60 includes a plurality of vertically spaced transversally extending plates 61 which have bent ends 61' which are pivotally mounted on rods 62 supported adjacent each end by bars 63 secured to the sides of the conduit 16. The plates 61 preferably extend from the rods towards the conduit 25 and intermediate the length of the plates 61, we provide an operating member 64 which extends through apertures provided in the plates 61 and out of the conduit 16 through a suitable aperture.

The upper end of the member 64 is preferably provided with screw threads as at 65 which are engaged by a nut member 66. Adjacent the lower end of the member 64 we secure thereto a collar 67 which is adapted to engage the lower face of the lower plate 61 and adjacent the upper plate 61 we secure a collar 68 to the member 64 which is adapted to engage the upper face of the upper plate 61.

Surrounding the member 64 between each of the plates 61, we provide a sleeve 69. From the foregoing it will be apparent that when the nut member 66 is rotated in one direction the plates 61 will be inclined upward and when the nut member is rotated in the opposite direction the plates 61 will be inclined downward. If an excessive amount of moisture is being expelled from the device the baffle plates 61 may be either inclined upwardly or downwardly whereupon as the air comes in contact with the baffle plates 61 it will be diverted from a straight course and as it passes between the baffle plates 61 some of the moisture in the air will condense and adhere to the plates 61 thus lessening the moisture expelled from the device. Thus it will be seen that although the amount of moisture expelled from the device will be lessened the amount of air expelled will not be greatly reduced.

From the foregoing description it will be apparent that we have provided a novel humidifier which is simple in construction and highly efficient in use.

Having thus described our invention, we claim:

1. In a humidifier, a closed tank, a conduit communicating with the interior of said tank, an entranceway in said tank, an exit passageway in said conduit, means to draw air through said entranceway into said tank and thence into said conduit and out said exit passageway, means to mix water in the tank with the air passing through said tank, and means to reduce the amount of moisture expelled from said exit conduit without materially reducing the volume of air expelled therefrom, said last mentioned means comprising a baffle member, said baffle member including a pair of side bars, a plurality of plates, each of said plates having bent ends, said ends having apertures to receive said rods said plates forming deflecting members, an operating member connecting said plates and means to hold said operating member in adjustable position.

2. In a humidifier, a closed tank, a conduit communicating with the interior of said tank adjacent one end, an entranceway in the top of said tank adjacent the opposite end thereof, an exit passageway in said conduit, means to draw air through said entranceway into said tank and thence into said conduit and out said exit passageway, a plurality of rotatable members in said tank adjacent said entranceway, means to rotate said members, a plurality of radially extending pins on said rotatable members, said pins upon rotation of said members being adapted to dip into water in the tank and to centrifugally throw the water thereon into the air passing through said tank, a plurality of vertically spaced transversely extending plates in said conduit, said plates being pivotally mounted adjacent one end thereof, means to support said plates in a horizontal position to allow uninterrupted passage of said air through said conduit and means to tilt said plates to alter the straight passage of air through said conduit.

3. In a humidifier, a tank having a closed top, a conduit above said tank, an entrance way in the top of said tank adjacent one end, a communicating passageway between said tank and said conduit adjacent the end of said tank opposite said entranceway, an exit communicating with the interior of said conduit, a plurality of paddle wheels rotatably mounted in said tank adjacent said entranceway, means to rotate said paddle wheels, each of said paddle wheels having a plurality of vanes thereon and each of said vanes having a plurality of pins extending radially therefrom, a guard member positioned around each of said paddle wheels, an opening in the bottom of each of said guards and an opening in the side of each of said guards extending from approximately horizontally in line with axis of said paddle wheels to approximately vertically above the axis of said paddle wheels, a plate adjacent each end of said paddle wheels, means to support said plates spaced from the side walls of said tank, a plurality of apertures in each of said plates coaxial with the axes of said paddle wheels, means to supply water to said tank, means to maintain the water level in said tank at a predetermined level, said paddle wheels being positioned in said tank to support said vanes out of the water with a portion of each of said pins dipping into the water when said paddle wheels are rotated, a fan rotatably mounted in said exit conduit and means to rotate said fan, said fan being adapted upon rotation thereof to draw air through said entranceway into said tank and thence into said conduit and out said exit.

4. In a humidifier, a tank having a closed top, a conduit above said tank, an entrance way in said tank adjacent one end, a communicating passageway between said tank and said conduit adjacent the end of said tank opposite said entranceway, an exit from said conduit directly to the atmosphere, a wheel rotatably mounted in said tank adjacent said entranceway, means to rotate said wheel, said wheel having a plurality of radial members thereon, means to supply water to said tank, means to maintain the water level in said tank at a predetermined level, said wheels being positioned in said tank with said radial members dipping into the water when said wheels are rotated, a fan rotatably mounted in said exit conduit, means to rotate said fan, said fan being adapted upon rotation thereof to draw air through said entranceway into said tank and thence into said conduit and out said exit, said tank having a cross sectional area greater than the cross section area of said conduit and baffle means in said conduit to reduce the amount of moisture expelled from said conduit without materially reducing the amount of air expelled therefrom.

WILLIAM H. WERHAN.
LAWRENCE L. WERHAN.
FRANK S. USREY.